US011117418B2

(12) United States Patent
Kauffman et al.

(10) Patent No.: US 11,117,418 B2
(45) Date of Patent: Sep. 14, 2021

(54) STAND FOR HOLDING CONTAINER AT AN ANGLE

(71) Applicants: Emmet Kauffman, San Francisco, CA (US); Caleb Kauffman, San Francisco, CA (US)

(72) Inventors: Emmet Kauffman, San Francisco, CA (US); Caleb Kauffman, San Francisco, CA (US)

( * ) Notice: Subject to any disclaimer, the term of this patent is extended or adjusted under 35 U.S.C. 154(b) by 0 days.

(21) Appl. No.: 16/376,102

(22) Filed: Apr. 5, 2019

(65) Prior Publication Data

US 2020/0062025 A1 Feb. 27, 2020

Related U.S. Application Data

(63) Continuation of application No. 15/158,166, filed on May 18, 2016, now abandoned.

(60) Provisional application No. 62/163,852, filed on May 19, 2015.

(51) Int. Cl.
| | | |
|---|---|---|
| *B44D 3/14* | (2006.01) | |
| *B65D 21/02* | (2006.01) | |
| *B67D 3/00* | (2006.01) | |
| *B05C 17/02* | (2006.01) | |
| *B05B 7/14* | (2006.01) | |
| *B62B 1/26* | (2006.01) | |
| *B65G 65/24* | (2006.01) | |

(52) U.S. Cl.
CPC ............ *B44D 3/14* (2013.01); *B05C 17/0245* (2013.01); *B65D 21/0209* (2013.01); *B67D 3/0029* (2013.01); *B05B 7/1404* (2013.01); *B62B 1/264* (2013.01); *B62B 2202/02* (2013.01); *B65G 65/24* (2013.01)

(58) Field of Classification Search
CPC .......... B65G 65/23; B65G 65/24; B65G 7/08; B67D 3/0029; B67D 3/0083; B67D 3/0051; B67D 7/845; B67D 3/009; B62B 1/264; B62B 2202/02; B62B 1/14; B62B 1/002; B62B 2203/05; B65D 21/02; B65D 21/023; B65D 21/0233; B05B 15/60; B05B 15/30
USPC ............. 248/146, 148, 371, 133, 139, 311.3, 248/309.4; 222/164, 166, 105, 173, 185.1
See application file for complete search history.

(56) References Cited

U.S. PATENT DOCUMENTS

| | | | |
|---|---|---|---|
| 1,716,281 | A | 6/1929 | Pavey |
| 2,466,323 | A | 4/1949 | Meyer |
| 2,489,390 | A | 11/1949 | Stearns |
| 2,744,670 | A | 5/1956 | Bendot |
| 2,837,305 | A | 6/1958 | Andren |
| 2,844,264 | A | 7/1958 | Stirm et al. |
| 3,035,737 | A | 5/1962 | Speas et al. |

(Continued)

FOREIGN PATENT DOCUMENTS

| | | |
|---|---|---|
| CN | 201239071 | 5/2009 |
| KR | 10-1999-0027263 | 4/1999 |
| WO | 98/34526 | 8/1998 |

*Primary Examiner* — Jonathan Liu
*Assistant Examiner* — Taylor L Morris
(74) *Attorney, Agent, or Firm* — McDonnell Boehnen Hulbert & Berghoff LLP

(57) ABSTRACT

A stand for holding a cylindrical receptacle at an angle including a first support, a second support positioned at an angle X in relation to first support and associated with first support at a vertex and a base, the base uniting the first support and the second support.

3 Claims, 4 Drawing Sheets

(56) References Cited

U.S. PATENT DOCUMENTS

| | | | | |
|---|---|---|---|---|
| 3,269,608 | A * | 8/1966 | Weber, III | B65D 83/262 |
| | | | | 222/180 |
| 3,286,849 | A * | 11/1966 | Dominos | B67C 9/00 |
| | | | | 211/74 |
| 3,325,058 | A * | 6/1967 | West, Jr. | B67D 3/0009 |
| | | | | 222/146.5 |
| 3,814,293 | A | 6/1974 | Daves | |
| 4,003,503 | A | 1/1977 | Aldridge | |
| 4,408,774 | A | 10/1983 | Raskob | |
| 4,432,161 | A * | 2/1984 | de Bruin | B65D 21/0233 |
| | | | | 47/41.01 |
| 4,976,385 | A | 12/1990 | Matsumoto | |
| 5,014,880 | A | 5/1991 | Loesel, Jr. et al. | |
| 5,156,411 | A * | 10/1992 | Owens | B44D 3/126 |
| | | | | 118/504 |
| 5,207,329 | A * | 5/1993 | Hwang | B65D 21/02 |
| | | | | 206/509 |
| 5,238,146 | A | 8/1993 | Thorne, Jr. | |
| 5,527,052 | A | 6/1996 | Litin | |
| 5,755,816 | A | 5/1998 | Schirmer et al. | |
| 5,853,154 | A | 12/1998 | Ashley | |
| 6,026,553 | A * | 2/2000 | Brunelle | B65D 21/0209 |
| | | | | 206/509 |
| 6,189,720 | B1 * | 2/2001 | Gillispie | B65D 90/24 |
| | | | | 141/311 A |
| 6,213,352 | B1 | 4/2001 | Boyer, Jr. | |
| 6,290,074 | B1 * | 9/2001 | Syvuk | A47B 81/007 |
| | | | | 211/133.1 |
| 6,386,393 | B1 | 5/2002 | Paulovich et al. | |
| 6,398,462 | B1 * | 6/2002 | Fulkerson | B05B 7/1404 |
| | | | | 406/134 |
| 6,450,463 | B1 | 9/2002 | McCord et al. | |
| 6,533,227 | B1 * | 3/2003 | Rom | B44D 3/14 |
| | | | | 248/148 |
| 6,550,649 | B2 | 4/2003 | Han et al. | |
| 7,490,798 | B2 | 2/2009 | Mann | |
| 7,669,738 | B1 | 3/2010 | Byers | |
| 7,887,016 | B2 * | 2/2011 | Gunsaullus | E06C 7/14 |
| | | | | 248/238 |
| 7,963,728 | B2 * | 6/2011 | Henderleiter, Sr. | B05B 7/1404 |
| | | | | 406/141 |
| 8,011,622 | B1 | 9/2011 | Guthrie | |
| 8,016,000 | B2 * | 9/2011 | Jordan | B65G 69/181 |
| | | | | 141/4 |
| 8,033,585 | B1 * | 10/2011 | Wilson | B44D 3/14 |
| | | | | 294/159 |
| 8,087,678 | B2 | 1/2012 | Nowak | |
| 8,579,302 | B2 * | 11/2013 | Kinnen | B62B 1/14 |
| | | | | 280/47.2 |
| 9,162,694 | B1 * | 10/2015 | Fucarino | B62B 1/264 |
| 9,586,803 | B1 * | 3/2017 | Snyker | B67D 3/0051 |
| 10,011,475 | B1 * | 7/2018 | Brekke | B65G 65/23 |
| 2003/0042262 | A1 * | 3/2003 | Young | B44D 3/02 |
| | | | | 220/570 |
| 2003/0151218 | A1 * | 8/2003 | Swaffield | B62B 3/104 |
| | | | | 280/47.27 |
| 2004/0195248 | A1 * | 10/2004 | Garcia | B05C 17/0245 |
| | | | | 220/570 |
| 2005/0045641 | A1 * | 3/2005 | Doran | B44D 3/04 |
| | | | | 220/507 |
| 2005/0045780 | A1 * | 3/2005 | Forshee | B01F 15/00733 |
| | | | | 248/146 |
| 2005/0213424 | A1 * | 9/2005 | Peterhans | B01F 15/00733 |
| | | | | 366/129 |
| 2006/0124807 | A1 | 6/2006 | Nice | |
| 2006/0202096 | A1 | 9/2006 | Mazzola | |
| 2009/0173849 | A1 | 7/2009 | Rose et al. | |
| 2010/0006599 | A1 * | 1/2010 | Cebulski | G01F 1/00 |
| | | | | 222/71 |
| 2010/0164191 | A1 | 7/2010 | Kinnen et al. | |
| 2010/0243656 | A1 * | 9/2010 | Nazarian | B67D 7/02 |
| | | | | 220/495.02 |
| 2012/0292346 | A1 * | 11/2012 | Watson | D06F 39/022 |
| | | | | 222/185.1 |
| 2014/0306410 | A1 | 10/2014 | Becka | |
| 2014/0332520 | A1 | 11/2014 | Kooijker et al. | |
| 2015/0259002 | A1 * | 9/2015 | Reddi | B62B 1/12 |
| | | | | 280/47.18 |
| 2015/0321791 | A1 * | 11/2015 | Stanek | B65D 21/0233 |
| | | | | 29/428 |
| 2016/0129460 | A1 * | 5/2016 | Moore | B62B 1/22 |
| | | | | 280/830 |
| 2016/0280417 | A1 * | 9/2016 | Skvorecz | B65D 7/20 |
| 2018/0257424 | A1 * | 9/2018 | Robertson | B44D 3/121 |

* cited by examiner

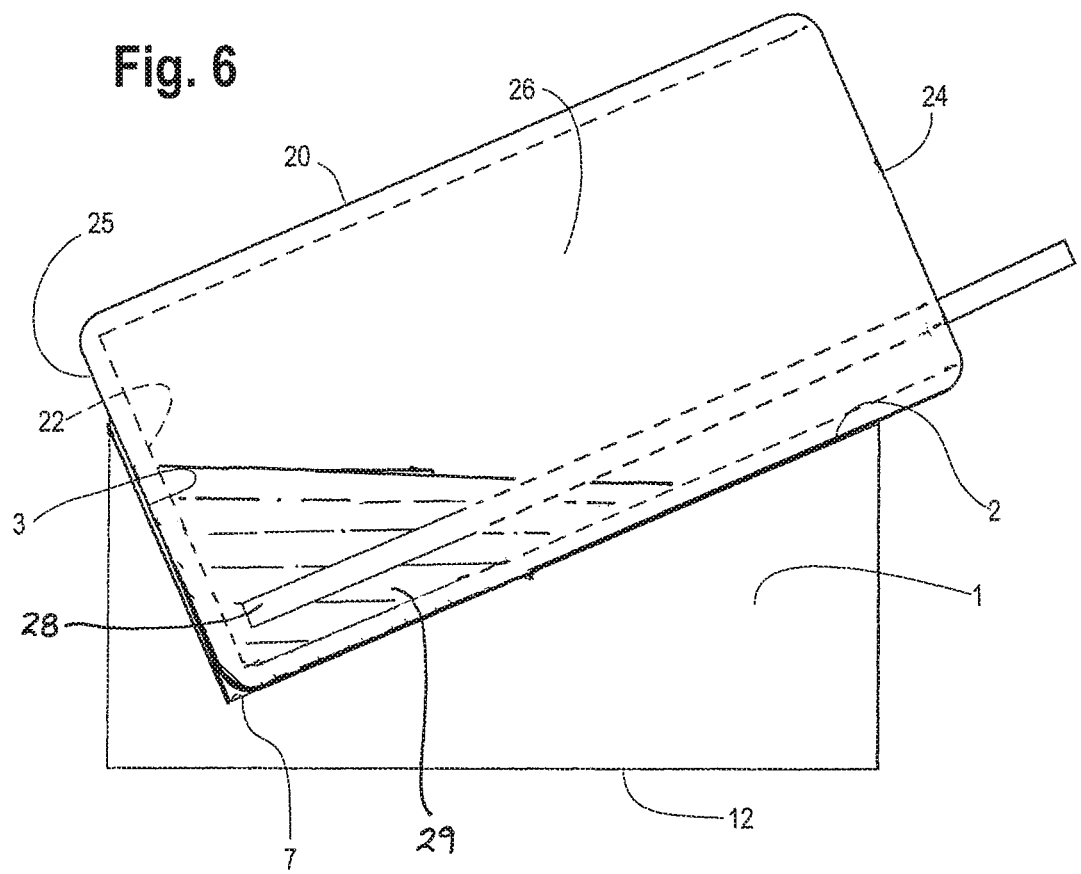

STAND FOR HOLDING CONTAINER AT AN ANGLE

This application claims priority to U.S. patent application Ser. No. 15/158,166 filed on May 18, 2016, now abandoned which in turn claims priority to U.S. provisional application 62/163,852 filed on May 19, 2015 the specifications of each of which are incorporated herein in their entirety.

BACKGROUND OF THE INVENTION

(1) Field of the Invention

This invention concerns a stand for holding a container at an angle and methods for using the stand in applications that require removal of material from the containers.

(2) Description of the Art

Containers with top openings are used to hold a variety of materials including liquids. In use, the liquid material can be removed from the container slowly over time or quickly. Regardless, liquid and especially viscous liquid can remain in the bottom of the container when the container is almost empty making the remaining liquid difficult to remove.

Paint containers are particularly prone to this problem, especially when a painter is using a spray gun with a dip leg that is placed in paint in the container. When the paint level reaches the dip leg inlet the paint gun loses suction and the painter must stop working and change paint buckets/cans thereby leaving residual paint in the container.

A need exists, therefore, for methods and apparatuses that allow for the removal of the vast majority of paint and other liquids or solids held in a container without manual intervention.

SUMMARY OF THE INVENTION

One aspect of this invention is stand for holding a cylindrical receptacle at an angle comprising: a first support; a second support positioned at an angle X in relation to first support and associated with first support at a vertex; and a base, the base uniting the first support and the second support such that the angle $y^1$ between base and the first support is greater than 0 degrees and less than 90 degrees.

Another aspect of this invention is a method for removing liquid from a container comprising the steps of: placing a dip leg of a liquid removal device into a container holding a liquid wherein the container includes a circular bottom that is integral to cylindrical side walls that are oriented perpendicular to the circular bottom; placing the container into a stand including a first support, a second support positioned at an angle X in relation to first support and associated with first support at a vertex, and a base, the base uniting the first support and the second support such that an angle $Y^1$ between base and the first support is greater than 0 degrees and less than 90 degrees in a manner such that the container side wall contacts the first support and the container bottom contacts the second support; allowing liquid to pool at a container low point; and removing the liquid pooled in the container low point until the liquid is essentially all consumed.

DESCRIPTION OF THE FIGURES

FIG. 6 is a side cutaway view of a container holder including a container;

FIG. 7A is a view of bottom of a container that can be placed in a container stand while

DETAILED DESCRIPTION

This invention concerns a stand for holding a container at an angle and methods for using the stand in liquid removal applications. This invention will be described below for efficiency sake with reference to containers such as cans and/or buckets. However, the stands of this invention and the methods of use them are applicable to any type of container that will benefit from pooling the container liquid or solid contents. Non-limiting examples of containers that can be placed in stands include but are not limited to cans, buckets, 55 gallon drums, bottles, jars, bladders, sacks and so forth.

Figure 1:
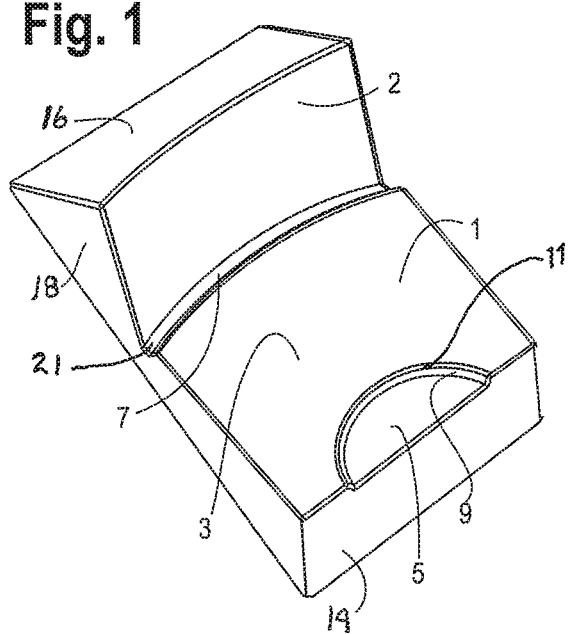
FIG. 1 is a perspective top view of a container stand of the present invention.

A container stand embodiment is shown in perspective view in FIG. 1. Stand 1 is arranged to hold a container at an angle. Although the illustrated embodiments of the invention are designed for smaller buckets and open topped containers, the stand may easily be enlarged or reduced in size to hold all types and sizes of cylindrical and non-cylindrical containers. In preferred aspects, stand 1 of a size that is sufficient to hold paint cans and buckets including 1 gallon cans and 5 gallon cans and buckets. However, as previously noted, the stand can equally be used to hold paint and other liquid containing cans that are smaller than 1 gallon in volume or it can be sized to hold very large containers such as 55 gallon drums.

Figure 2:
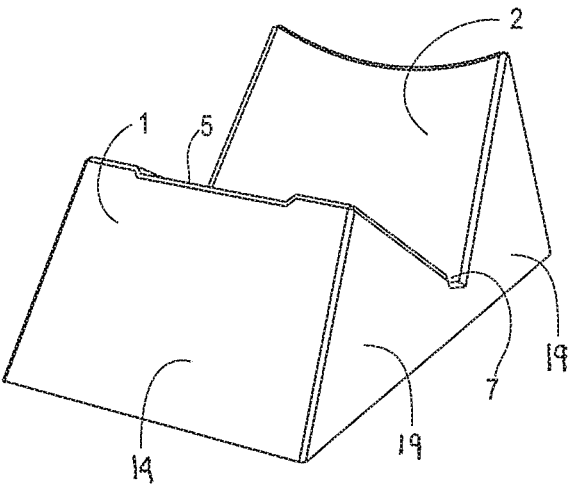
FIG. 2 is a front perspective view of the container stand shown in FIG. 1.
Figure 3:
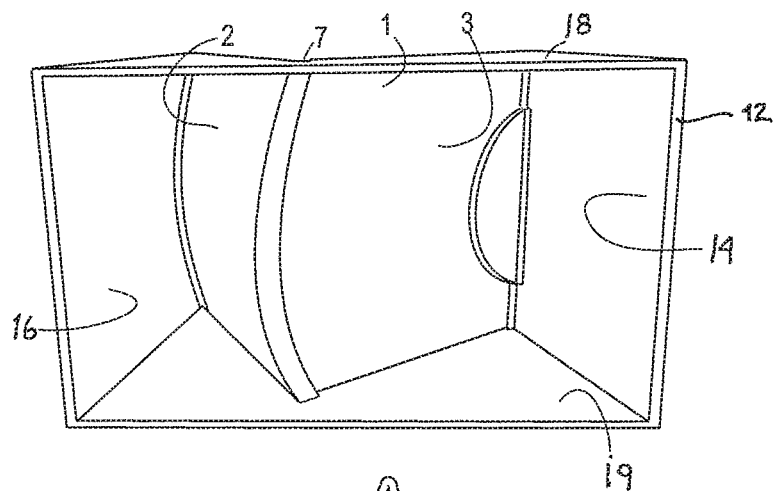
FIG. 3 is perspective bottom view of the container stand shown in FIG. 1.

Stand 1 includes a first support 2 and a second support 3. First support 2 and second support 3 abut one another at vertex 7 and are oriented in an upwardly angled relationship from vertex 7 with respect to one another. Stand 1 further includes a base 12. In FIGS. 1-3, stand 1 further includes a first side wall 14, a second side wall 16, a first end wall 18 and a second end wall 19. Finally, stand 1 includes an optional indentation 5 including a shoulder 9.

Figure 5:
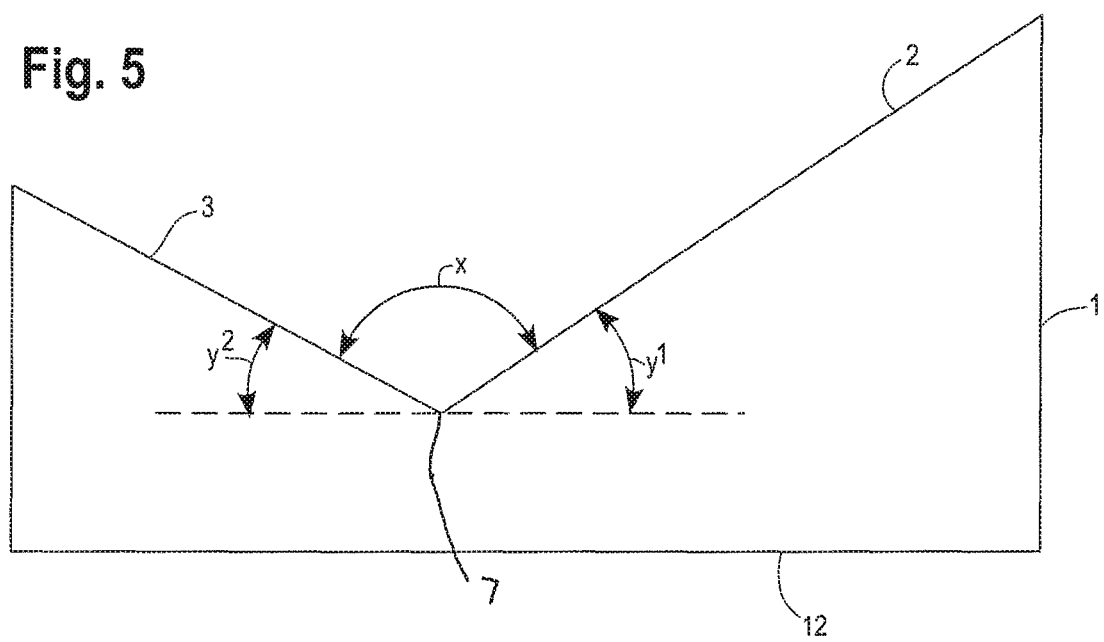
FIG. 5 is a representation of the angular relationship of features of a container holder of the present invention.

Stand 1 of FIGS. 1-3 includes a first support 2 and a second support 3. As noted above, first support 2 and second support are oriented in an angled relationship with the angle formed by the union of first support 2 and second support 3. As shown in FIG. 5, the angle X between first support 2 and second support 3 as measured at vertex 7 will typically depend upon the angle between the bottom of the container and the side of the container. While the angle X may range from about 60 to about 120 degrees, in most embodiments, the angle will be about 90 degrees.

The angles $y^1$ and $y^2$—the angle between each of first support 2 and second support 3 and the plane formed by base 12 can also be varied. Each of angles $y^1$ and $y^2$ can vary from greater than about 0 degrees up to about 90 degrees so long at $X+y^1+y^2=180$ degrees. Typically $y^1$ will be and angle from about 30 to about 60 degrees, more preferably from about 40 to 50 degrees and most preferably about 45 degrees to maximize the pooling of liquid in the angled container.

In some cases, angle X of the stand can depend upon how the container is being used. As noted above, a stand angle $y^1$ and or $y^2$ of about 45 degrees would often produce the optimal pooling of liquid/material at the base of the container. However, many paint sprayers and drum pumps have fixed 90 degree dip legs. When using a stand having a 45 degree angle ($y^1$) between first support 2 and base 12, the upper edge of the container's opening will overhang the base of the container, potentially preventing a fixed 90 degree dip leg from accessing the liquid/material.

Figure 8:
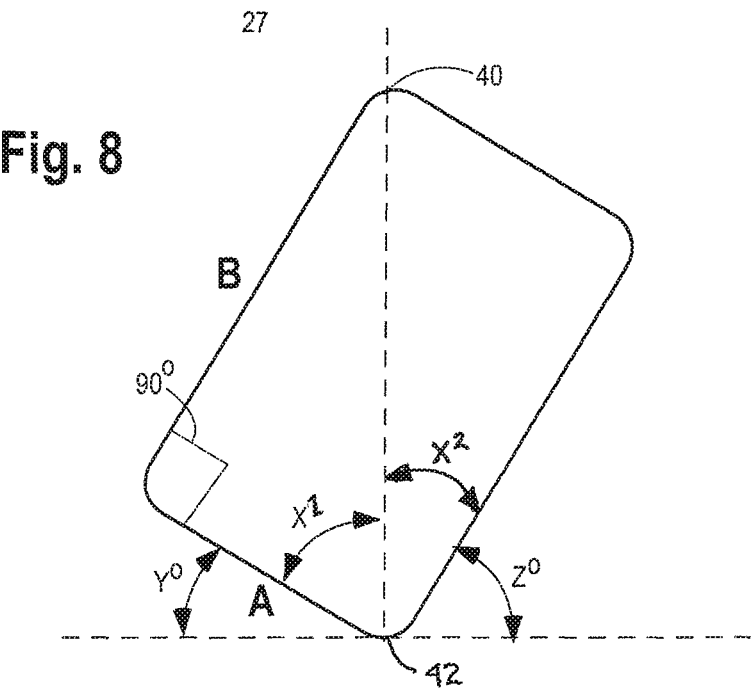
FIG. 8 is a representation of the features of the container that are useful in determining an optimal container angle.

As is shown in FIG. 8, to accommodate a 90 degree fixed dig leg (a dip leg oriented perpendicular to a container bottom), the upper lip of the highest point 40 of the container is preferably located essentially directly above the lowest point of the opposite base 42 of the container. The optimal stand angle $X^1$—the angle between a line running between highest point 40 and lowest point 42 that is perpendicular to the ground can be calculated based on the dimensions of the container it is designed to hold. In FIG. 8, $X^1=(\tan\hat{\,}1)$ of (B/A), $Y°=90°-X^1$ and $Z°=90°-Y°$. Using a 5 gallon bucket for example having average bucket dimensions of: Height 15" (B) and Width 11" (A). For this bucket, $X^1=(\tan\hat{\,}-1)(15/11)=53.75°$ (optionally 50-55 degrees); $Y°=90-53.75=36.25°$ and $Z°=90-36.25=53.75°$. Using a 55 gallon drum having a height of 34.8" (B) and a width of 23" (A), useful angles would be $X^1=(\tan\hat{\,}-1)(34.8/23)=56.54°$ (optionally 53-60 degrees); $Y°=90-56.54=33.46°$ and $Z°=90-36.25=56.54°$. In FIG. 8, $X^2=180-X^1-Y°-Z°$.

Figure 4:
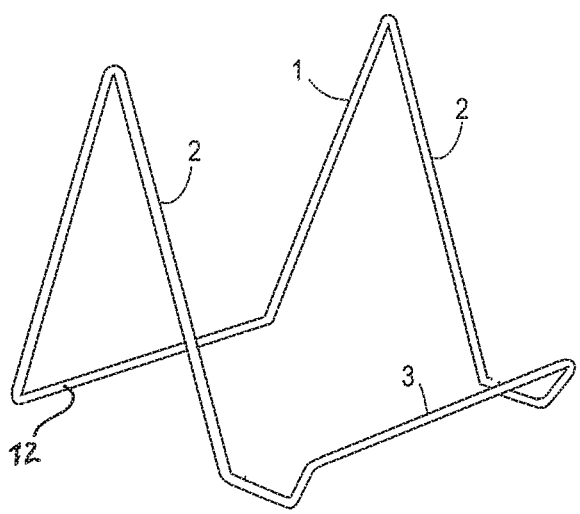
FIG. 4 is a perspective side view of a container stand constructed of a rigid tubular material.

Stand 1 may be a solid molded article such as is shown in FIGS. 1-3. Alternatively, stand 1 may be tubular and include very few if any little solid walls such as is shown in FIG. 4. What is important is that stand 1 includes a first support 2 and associated second support 3 such that a container can be retained in stand 1 in an angled position.

Stand 1 may be made from any variety of materials that are capable of supporting a filled container at an angle. Stand 1 may be made of metal, plastic, elastomers, rigid foam/polymers, ceramics and so forth. In one aspect stand 1 is made of injection molded plastic. In another aspect, stand 1 is made from a tubular or solid metal material as show in FIG. 4.

The method of manufacturing stands will vary depending upon the stand material. Examples of possible manufacturing methods include 3D printing, injection molding, extrusion molding, vacuum molding, die casting, forging, machining, or joining. Other manufacturing or construction methods may be utilized to best accommodate various applications for the stand.

If first support 2 has a solid or semi-solid planar surface, then the surface of first support 2 can also be modified to allow it to confirm to the surface of the container it will hold. For example, bucket 20 in FIG. 6 is a cylindrical container. Therefore, the planar surface of first support 2 would be a concave surface as shown in FIG. 2. In an aspect of this invention, first support 2 can have a concave surface with an arc that corresponds to the corresponding arc of the cylindrical container perimeter held by stand 1. In some aspect, the width of the arc of first support 2 will be equal to about 1 to about 7% of the perimeter of the container held in stand 1.

It should be noted that the semi-solid or solid first support surface 2 can take on any shape or include any features that allow a container to be firmly retained in place in stand 1. For example, first support 2 can include a surface that includes a recess 21 having an optional angled wall 13 to retain a perimeter lip 25 of a container. Angled wall 13 makes it easier for the user to nest a perimeter lip 25 of a container in recess 21 so as to anchor the container in the stand thereby keeping the container from tipping on its side. In this example, the depth of recess 21 would be equal to or greater that the height of lip 25 measured from the container bottom 22 to the end of lip 25. In another example, magnets may be incorporated into one or both of the first support and/or second support to aid in securing magnetizable containers in stand 1. Similarly, stand 1 may include locking devices to secure containers in place.

As shown in FIG. 6, stand 1 is dimensioned to receive a typical 5 gallon bucket 20 that has a planer circular bottom 22, an open top 24 that can accept a lid (not shown) and cylindrical walls 26 perpendicular to circular bottom 22. Bucket 20 is placed in stand 1 such that the circular bottom 22 of bucket 20 rests against second support 3 and the cylindrical wall 26 of bucket 20 rests against first support 2. Thus the width and length of the first support 2 and second support 3 can be proportioned relative to the size of the container it will hold.

In one aspect, the stands of this invention will be used to hold container that are associated with liquid removal devices that include dip legs that are immersed in the liquid in the container and where liquid is removed from the container via the dip leg. Such liquid removal devices include pumps, vacuum systems. Some examples of liquid removal devices include paint sprayers and drum pumps including pumps that are used to remove hydraulic fluid from 55 gallon drums.

The description below of methods of using the stands discussed above with a liquid removal device is directed to paint spraying devices. However, the method described in equally applicable to any container liquid removal device such as 55 gallon drum pumps. Upon opening a paint bucket, a painter will place the dip leg 28 of a paint spraying device into the bucket until the bottom of the dip leg is immersed in the paint and the dip leg inlet is near or at the bottom of the bucket. The painter will then remove paint from the container with the paint spraying device. However, when the bucket is almost emptied of paint, the spraying device can lose suction even though paint remains in the bucket. At this point, the painter will place the bucket into stand 1 as shown in FIG. 6 such that the spraying device dip leg 28 is positioned at the low point of bucket 20. Because the bucket is oriented at an angle, the remaining paint 29 in bucket 20 will pool at the low point which can then be drawn into dip leg 28 and directed to the paint spraying device. Bucket 20 is removed from stand 1 and dip leg 28 is removed from bucket 20 when essentially all of the paint that flows to the can low point is consumed. The terms "essentially all consumed" or "essentially consumed" means that not enough liquid remains in the bucket or container to be efficiently drawn into the dip leg, or otherwise be withdrawn or removed. The amount of paint that remains in the bucket will be less than the amount of paint that would have remained in the bucket had the container be allowed to remain in a vertical position, i.e., had it not be placed in stand 1. Bucket 20 may be placed in stand 1 at any time after enough paint (or any other liquid) has been removed from bucket 20 to prevent paint from spilling out of the open top of bucket 20 when it is placed in stand 1.

As noted above, stands 1 have many additional uses beyond holding paint buckets and cans. Stand embodiments may be used for manufacturing applications. Stands may be used to hold, at an angle, a keg, drum, vat, or barrel. In one aspect, the stands can be used to hold 55 gallon drums of industrial liquids. In one particular aspect the 55 gallon drums hold hydraulic liquid. Users of hydraulic liquids face the same problem as painters when removing hydraulic fluid and other fluids/materials from a drum. Manufactures use a drum pump with a dip lea to remove the fluid that is similar to a paint sprayer. Thus, placing the 55 gallon drums on a stand 1 will allow the hydraulic fluid in the drum to be essentially consumed.

Stands can also be used for cooking applications. For example, a stand may be used to hold, at an angle, a cooking pot, can, bowl, or pitcher or jar. The stands may be used in other applications where the removal of fluid or sold materials from containers can be facilitated by allowing the solid or liquid materials to pool over a period of time in an angled container.

Stands 1 can be manufactured so that they can be stacked for easy transport and storage. Stacking is facilitated in the stand shown in FIGS. 1-3 by forming stand 1 with a hollow base 10 as shown in FIG. 3. In addition, the side and end walls of stand 1 can be tapered slightly inwardly from the base so that multiple stands can be stacked. If stands 1 are tapered for nesting in one another, then the angles $x^1$ and $x^2$ as shown in FIG. 8 will not add up to exactly 90 degrees as they would if base A were perpendicular to wall B.

Figure 7A:
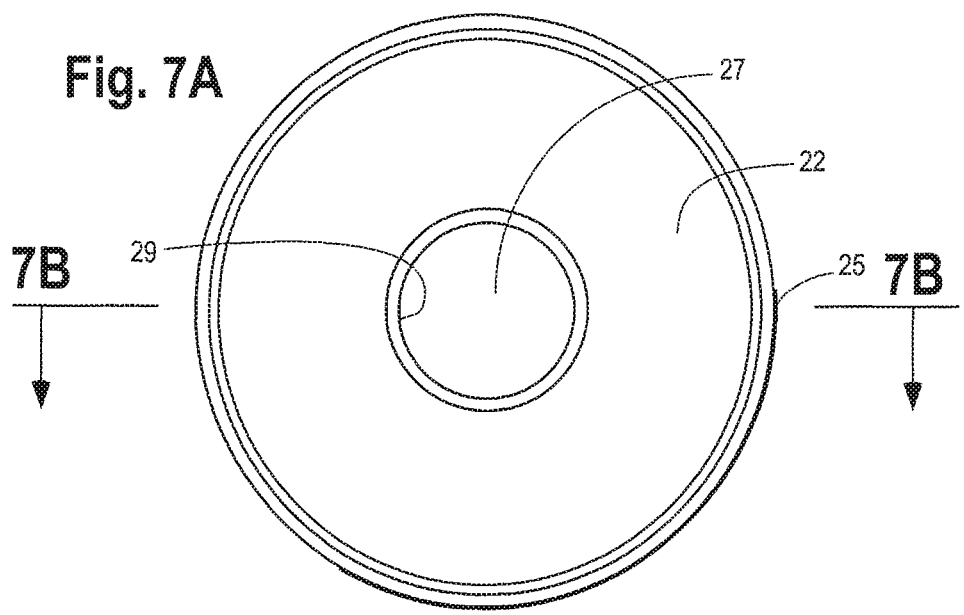
Figure 7B:
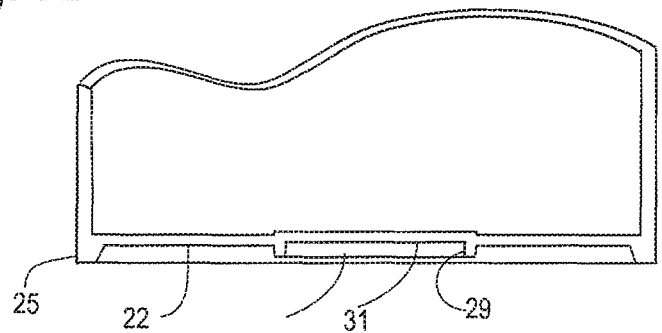
FIG. 7B is a side cutaway view of the same container bottom.

As noted above, certain stand embodiments may utilize cut-outs, recesses, projections, protrusions or indentations 5 in the bottom or side supports of the stand. For example, containers such as cans and buckets may include a bottom circumferential lip 25 (shown in FIG. 7) that separates the container bottom 22 from a surface upon which the container is placed. Larger paint containers can include an indentation 27 that includes a second circumferential lip 29. In some containers, circumferential lip 29 has a height above the indentation bottom 31 that is equal to or less than the height of lip 25 from container bottom 22. In order to firmly secure bucket in stand 1, an indentation 5 is incorporated into stand 1. Indentation 5 will have a shape that is complementary to the shape of the container bottom protrusion and in the container bottom shown in FIGS. 7A and 7B, indentation 5 will have an arc 11 that is equal to or slightly greater than an arc portion of circumferential lip 29. That way, the container with indentation 27 can be placed into stand 1 in a manner that inhibits the lateral movement of the container in stand 1.

The foregoing description of the specific embodiments will reveal the general nature of the disclosure so others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. A stand for holding a container at an angle, the container including a planar circular bottom that is integral to cylindrical side walls that are oriented perpendicular to the circular bottom and an open top, the stand comprising:
   a first support having a continuous concave surface for accepting the side wall of the cylindrical container;
   a second support having a planar surface positioned at an angle X in relation to the first support and abutting the first support at a vertex wherein the angle X is measured between the first, support and the second support at the vertex and wherein X ranges from 60 degrees to 120 degrees; and
   a base, the base uniting the first support and the second support such that an angle $y^1$ between a plane formed by the base and the first support is greater than 0 degrees and less than 90 degrees, an angle $y^2$ between a plane formed by the base and the second support is greater than 0 degrees and is less than 90 degrees, wherein $y^1$ and $y^2$ are each about 45 degrees such that $X+y^1+y^2$ is equal to 180 degrees wherein the second support includes an indentation having a shape that is complementary to a bottom protrusion of container, wherein an underside portion of the base is hollow and configured such that a plurality of stands can be stacked or nested within each other.

2. The stand of claim 1, wherein $y^1$ is between 30 to 45 degrees.

3. The stand of claim 1, wherein $y^2$ is between 45 to 60 degrees.

* * * * *